Feb. 2, 1965
I. NESSON
3,168,743
MOTION PICTURE APPARATUS WITH VARIABLE FILM CLAW SPEED
Filed April 19, 1963
5 Sheets-Sheet 1
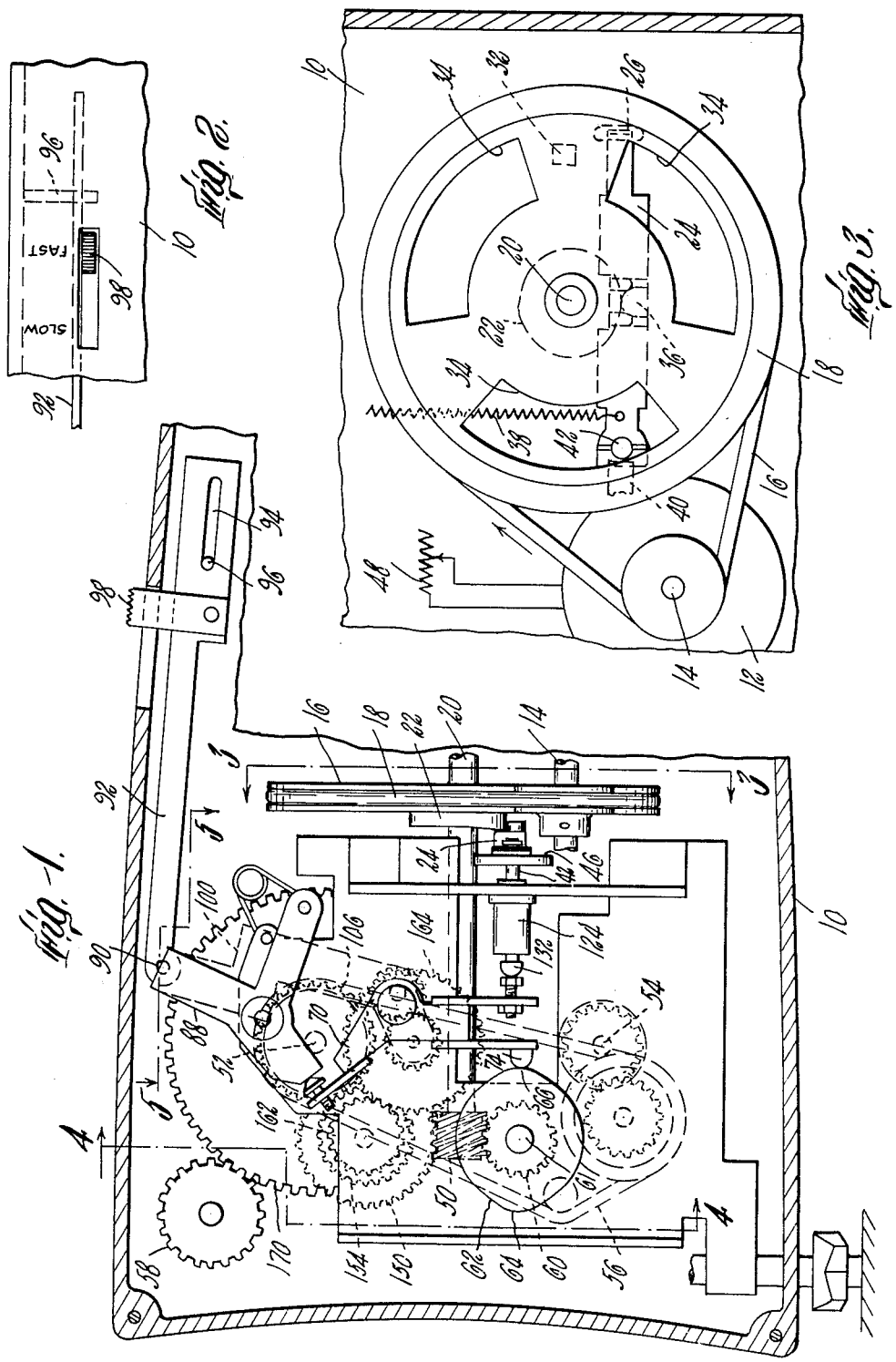

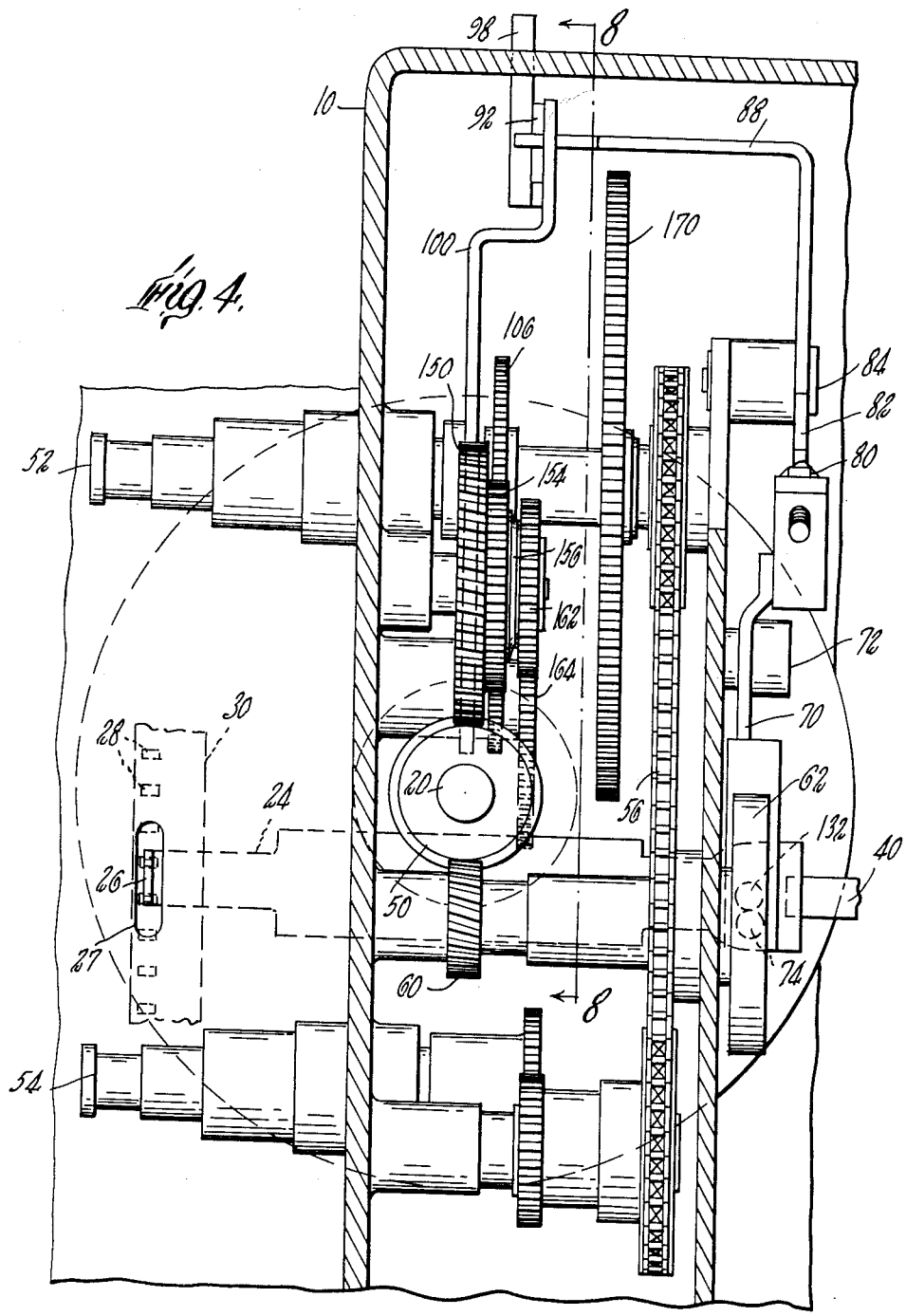

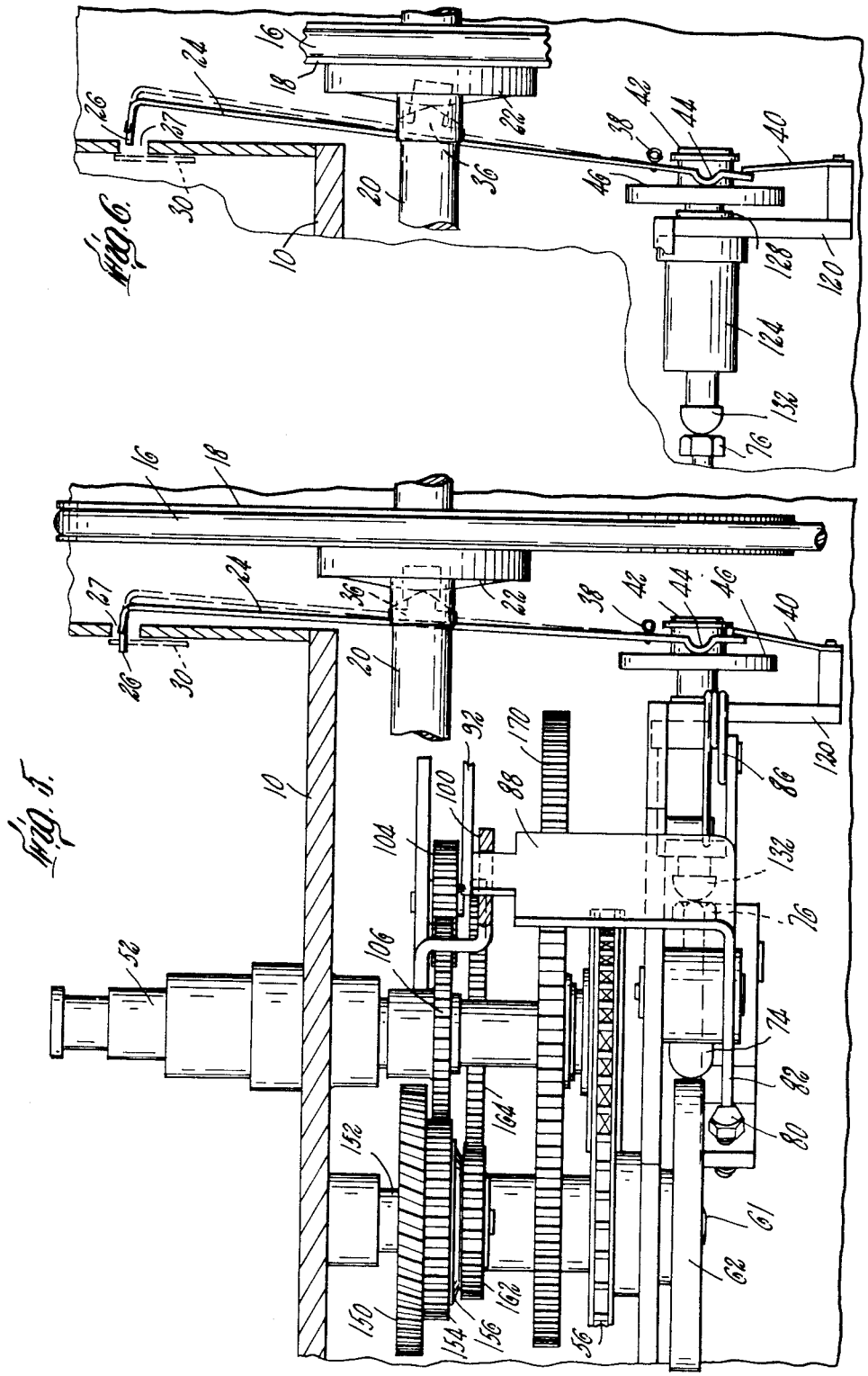

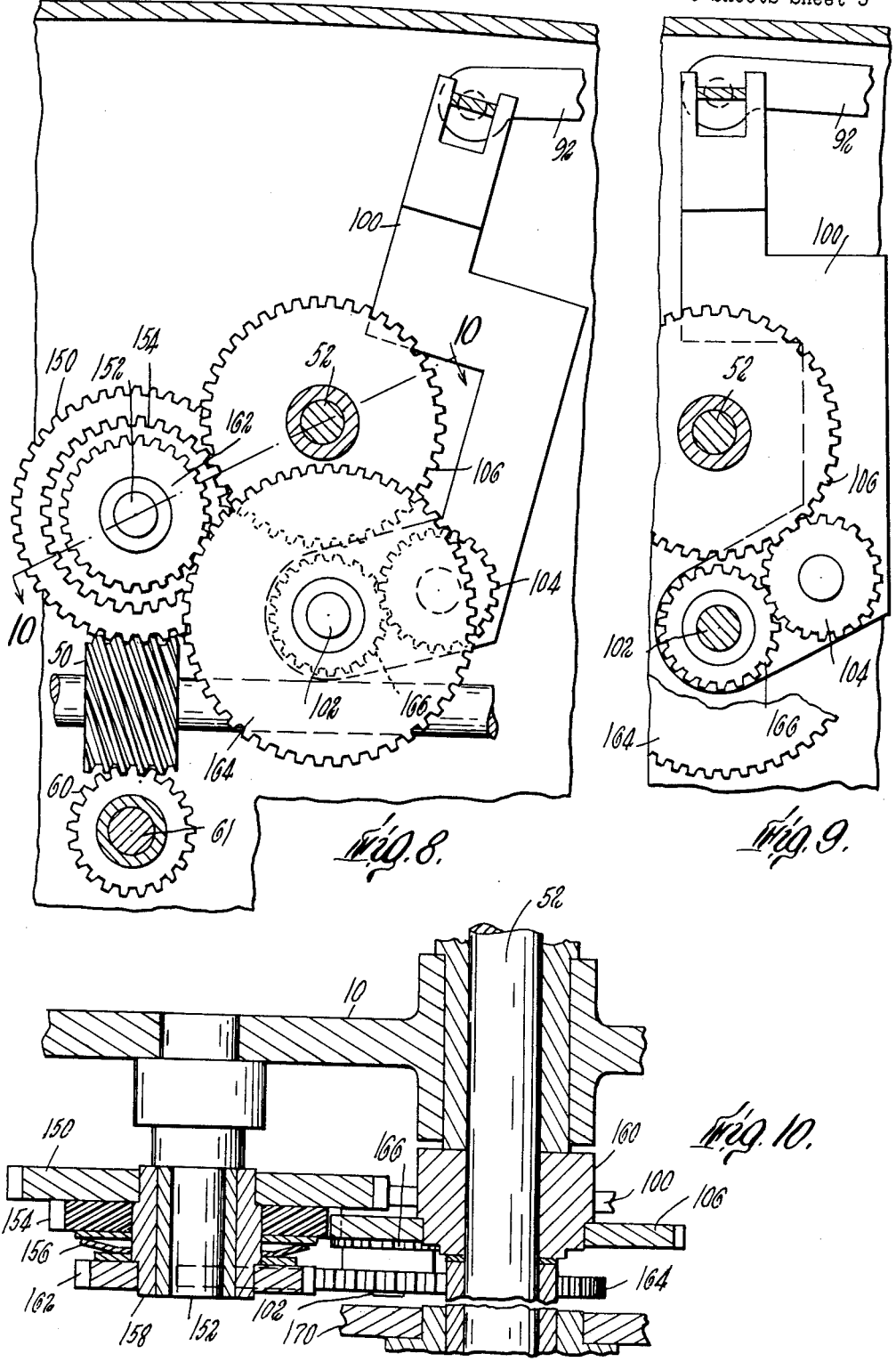

United States Patent Office 3,168,743
Patented Feb. 2, 1965

3,168,743
MOTION PICTURE APPARATUS WITH
VARIABLE FILM CLAW SPEED
Israel Nesson, Brighton, Mass., assignor to Keystone
Camera Company, Inc., Boston, Mass., a corporation of Massachusetts
Filed Apr. 19, 1963, Ser. No. 274,235
14 Claims. (Cl. 352—180)

This invention relates to motion picture apparatus and more particularly to improvements in film feed mechanisms for such apparatus.

In the operation of a motion picture apparatus, for example the display of images recorded on film, it is frequently desired to change the feed speed of the film, either to speed up or slow down the displayed motion. Typically, the film drive mechanism includes a film claw which engages the film perforations and advances the film in synchronism with the shutter so that the film is motionless at the image aperture during the interval of time that the shutter allows light to fall on the film. A conventional shutter disc has three apertures in it, and the intermittent feed advances the film one frame for each rotation of the shutter. In this manner for a film feed speed of sixteen frames per second the obturating frequency of the shutter is forty-eight times per second—a sufficiently high frequency to avoid the production of light flicker that is detectable by the eye. When the film speed is slowed down, however, in slow motion operation, the obturating frequency becomes correspondingly less and detectable flicker results. A method of avoiding this objectionable flicker in slow motion operation is to use a shutter disc arrangement in which the number of apertures changes as a function of the speed of the shutter disc. However, such arrangements reduce the amount of light that is transmitted to the film. In addition, such devices involve complex mechanisms which are expensive to manufacture.

Accordingly, it is an object of this invention to provide an improved film feed mechanism for use in motion picture apparatus which enables slow motion operation without reduction of the amount of transmitted light and without the production of objectionable flicker.

Another object of the invention is to provide a novel and improved intermittent film feed mechanism for varying the rate of film feed in motion picture apparatus independently of the speed of rotation of the shutter.

Another object of the invention is to provide novel and improved motion picture projector apparatus.

Still another object of the invention is to provide novel and improved intermittent feed mechanisms in motion picture projector apparatus which enables slow motion operation of the apparatus.

A further object of the invention is to provide novel and improved coordinated continuous and intermittent film feed mechanisms which enable variation in the rate of film feed in motion picture projector apparatus.

Other objects, features and advantages of the invention will be seen as the following description of the preferred embodiment thereof progresses, in conjunction with the drawings, in which:

FIG. 1 is a sectional view through a portion of a motion picture projector apparatus constructed in accordance with the invention showing details of the shutter and film drive mechanisms;

FIG. 2 is a top view of the portion of the projector case showing the film drive control switch used in the projector apparatus shown in FIG. 1;

FIG. 3 is a sectional view taken along the line 3—3 of FIG. 1 showing the inter-relationship of the drive motor, the shutter disc and the intermittent film feed mechanism;

FIG. 4 is a sectional view taken along the line 4—4 of FIG. 3 showing details of the drive gearing arrangement employed in the projector apparatus;

FIG. 5 is a sectional view taken along the line 5—5 of FIG. 1 showing additional details of the drive gearing with the film drive mechanisms in a first position;

FIG. 6 is a view corresponding to a portion of FIG. 5 showing the intermittent film feed mechanism in a second position;

FIG. 8 is a gearing diagram showing the continuous film drive mechanism in a first position;

FIG. 9 is a gearing diagram showing the continuous film drive mechanism in a second position; and FIG. 10 is a sectional view taken along the line 10—10 of FIG. 8 showing the gearing and clutch arrangement for the continuous film drive mechanism.

Figure 7:
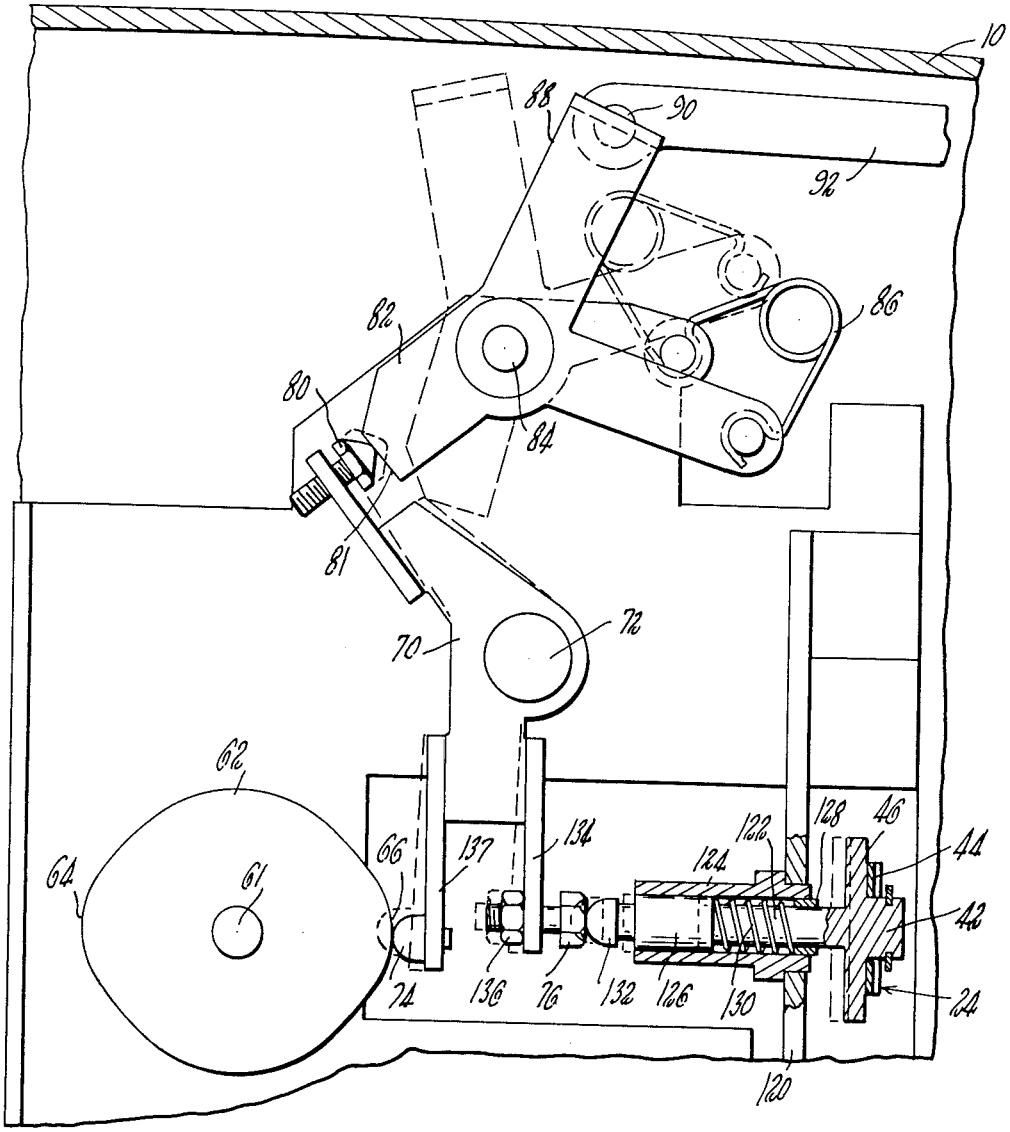
FIG. 7 is an enlarged view of the apparatus for controlling the speed of operation of the intermittent film feed mechanism.

With reference to FIGS. 1–5 there is shown a projector having a casing 10 in which is mounted a drive motor 12 whose output shaft 14 is coupled by means of a drive belt 16 to a shutter disc 18. The shutter disc 18 is mounted on a shaft 20 which has secured to it a cam 22 that includes edge and face cam surfaces to which impart in and out, and up and down, motion to an intermittent film feed mechanism in the form of lever arm 24.

Arm 24 includes a claw 26 at one end which engages perforations 28 in film 30 (FIG. 4), and its other end is secured on a pivot shaft 42 for movement about that point. The claw arm 24 carries a cam follower structure 36 intermediate its ends which is biased into engagement with cam 22 by means of springs 38 and 40. Cam 22 imparts a regular motion to lever arm 24 which normally causes the claw tooth 26 to periodically engage the film perforations 28 and move the film 30 past the projection aperture 32 in intermittent motion in synchronism with the apertures 34 in the continuously rotating shutter disc 18. The claw arm 24 at its pivot point surrounds shaft 42 so that it is free to pivot in a vertical plane, and further includes a bulge or offset portion 44 which engages surface 46 of the pivot structure so that pivoting motion is permitted in a horizontal plane.

A worm 50 is disposed on shutter shaft 20 and drives the continuous film drive mechaism which includes a gear train for driving the upper sprocket shaft 52 and lower sprocket shaft 54 in synchronism. The two shafts are driven as a unit by means of a timing belt 56 that interconnects the two systems. (The film supply reel (not shown) is driven from the sprocket drive mechanism through a gear 58 and one way clutch, and through suitable drive coupling, such as a chain drive and a one way clutch; the takeup reel is also driven by this same gear train.) Motor 12 is a series wound motor and its speed is controlled by a rheostat, diagrammatically indicated at 48, to provide a continuously variable control over the rotation speed of the motor shaft 14 and the shutter shaft 20. In this manner limited, continuously variable control over the shutter rotation speed and the film feed speed is provided.

Coupled to the shutter drive mechanism and driven directly by worm gear 50 is an auxiliary gear 60 which rotates a cam 62 that has two crests 64, 66. The cam 62 is adapted to rock a cam follower link 70 which is mounted for pivoting movement on shaft 72. This cam follower link includes a cam follower element 74 on one leg and an adjustable stop member 76 on a second leg that engages the end of the pivot shaft 42 which supports the claw arm 24. Link 70 includes a third arm that carries at its upper end an adjustable stop member 80 which engages a guide surface 81 of second pivotable link element 82 mounted for rotation on pivot shaft 84.

A spring 86 of the over center type biases the link 82 in either of two positions and the link 82 carries an arm 88 which is connected to the end 90 of a bar 92. The bar 92 includes a slot 94 at its opposite end in which a pin 96 is received for supporting the bar and is moved forward and backward by tab 98 between a "fast" position (rear) and a "slow" position (forward) (see FIGS. 1 and 2). (Additional details of this linkage structure are shown in FIG. 7 and will be discussed in greater detail in conjunction therewith.)

Also coupled to bar 92 is a gear control link 100 which is mounted for rotation about shaft 102 and which carries a gear 104 that is moved into engagement with the sprocket drive gear 106 for slow motion operation. Additional details of this gear control mechanism are shown in FIGS. 8–10 and will be discussed in conjunction therewith.

As shown in FIGS. 3–6 the intermittent feed claw arm 24 is mounted on a pivot shaft structure 42 and is controlled for up and down movement and in and out movement about that pivot shaft by cam 22 mounted on the shutter shaft 20. The cam follower structure 36 secured to the claw arm 24 follows the edge and face cam surfaces of cam 22 to cause the tooth portion 26 of the claw arm to be reciprocated into and out of an aperture 27 in the wall of the projector casing adjacent the image aperture 32 for engagement with perforations 28 of the film 30 to advance that film intermittently in synchronism with the rotation of the shutter disc 18.

The claw pivot structure is movable laterally between the position shown in FIG. 5 and the position shown in FIG. 6 as controlled by the link 70. The flat biasing spring 40 is mounted on a fixed structural member 120 relative to which the claw support pivot 42 moves as controlled by link 70 and urges the pivot shaft 42 to the left as viewed in FIG. 7 and against the pivot seat 46. As shown in that figure the pivot structure 42 includes a shaft portion 122 which is mounted within a sleeve 124 that is secured in position against the fixed support wall 120. A plug 126 in the sleeve forms one spring seat and a disc 128 at the other end of the sleeve forms a second spring seat. A compression spring 130 is positioned between the spring seats and biases the pivot shaft 42 to the left as shown in FIG. 7. (Where the biasing spring 40 exerts sufficient force, as is the usual case, the auxiliary spring and seat structures may be omitted.) At the end of shaft 122 there is a follower button 132 which engages the adjustable stop 76 which is in the form of a bolt threadedly secured on flange leg 134 of link 70 and locked in position by nut 136. A second flange leg 137 on link 70 carries the cam follower button 74 which is held just out of engagement with the crests 64, 66 of cam 62 when the link 70 is in position shown in FIG. 7.

When the control rod 92 is moved forward to rotate the link 82 to the dotted line position (FIG. 7) the over center spring 86 snaps the link 82 into the second position in which the restraining effect of surface 81 on adjustable stop 80 is removed. Spring 130 (or spring 40 if used alone) tends to rotate the link 70 in the clockwise direction and places the cam follower 74 in engagement with the surface of cam 62 so that that cam then controls the position of pivot shaft structure 42. The pivot structure 42 is then moved to the position shown in FIG. 7 twice during each rotation of the cam 62—that is when the cam follower 74 is in contact with a cam crest 64 or 66. The ratio of worm 50 and worm gear 60 is designed so that the cam 62 rotates at one-sixth the speed of rotation of shaft 20.

The two limits of movement of the claw pivot structure 42 are shown in FIGS. 5 and 6 respectively. In FIG. 5 the claw pivot is shown in the restrained or forward position in which it is urged when the cam follower 74 engages a cam crest 64, 66 with the linkage in the dotted line position. It will be noted that in this position the claw tooth 26 is caused periodically, by the cooperation of the shutter cam 22 and cam follower 36, to protrude through aperture 27 and into engagement with the film 30 so that it may advance the film. However, when the claw pivot 42 is allowed to move to the left (as viewed in FIGS. 5 and 6 and in a forward direction in the projector) spring 40 effectively rotates the claw arm 24 relative to the surfaces of cam 22 such that even at the high point of the face cam as shown in FIG. 6 the tooth 26 of the claw does not protrude through the aperture 27 and engage the film. Thus with the support 42 in this position the rotation of cam 22 does not produce any advance of the film 30.

With the linkage members 70 and 82 in the dotted line position (FIG. 7) the cam 62 causes the claw pivot to move to the position shown in FIG. 5 once for every three revolutions of the shutter disc 18. In this manner the rate of intermittent film feed operation is reduced to one-third its normal speed without varying the shutter speed and hence the flicker frequency. The cam 62 is rotatably adjustable on shaft 61 so that proper synchronism is obtained between the apertures 34 in the shutter disc 18 and the intervals when the claw pivot 42 is moved into operative position.

Thus there is provided a simple intermittent film feed mechanism which enables the intermittent film drive mechanism to be operated at a reduced speed without varying the speed of rotation of the shutter disc 18. With the series wound motor 12 subsidiary speed control is obtained through the use of rheostat 48. While this intermittent film drive mechanism control may be used alone in a "sprocketless" type of projector, where film lengths in excess of two hundred feet are employed it is necessary to provide auxiliary film driving means to avoid undue loading of the intermittent film drive mechanism. Conventionally a continuous feed mechanism is employed in which sprockets driven at continuous speed in synchronism with the intermittent film feed mechanism supplement the driving force of the intermittent film drive.

Where continuous film drive mechanisms are employed to supplement the intermittent film drive, provision must be made to change their speeds in coordination with the speed change of the intermittent film drive. As indicated above, the main drive shaft 20 also drives the sprocket shafts 52 and 54. This is accomplished through a second worm gear 150 mounted on shaft 152 (shown best in FIGS. 8–10). Also mounted on shaft 152 is a nylon gear 154 that is driven through a clutch disc 156. Gear 154 may rotate relative to the shaft sleeve 158 but ordinarily directly drives the sprocket gear 106 which is mounted on sleeve 160 and connected directly to the sprocket shaft 52. This driving force is coupled through chain 56 and gearing to drive the sprocket shaft 54 at the same speed.

An auxiliary gear train is driven by gear 162 which is also mounted on shaft 152 and directly keyed thereto. Gear 162 engages gear 164 which is mounted on the pivot shaft 102 on which the link arm 100 is also mounted. Also mounted on shaft 102 is a second gear 166 which is driven at the same speed as gear 164 and engages the idler gear 104.

In normal operation (with bar 92 in its rear position as shown in FIG. 8) worm gear 150 drives the gear 154 through clutch 156 to rotate the sprocket gear 106 at a speed synchronized with that of the shutter so that the sprocket drive advances the film at the same speed that the claw mechanism advances the film. However, when bar 92 is moved forward (slow motion) to the position shown in FIG. 9 the idler 104 which is continuously driven by gear 166 is brought into engagement with the sprocket gear 106 to drive that gear in this embodiment at one-third its previous speed. This drive is through a directly coupled train so the the sprocket gear 106 and the sprocket shafts 52, 54 are positively driven at a slower speed than previously. As sprocket gear 106 is in continuous engagement with nylon gear 154 that gear is similarly slowed down through this directly coupled gear train and slides relative to the clutch disc 156. (The large gear 170, partially shown in FIG. 10, is also mounted on shaft 52 and drives the reel gear 58. In addition, as is conventional, a rewind drive may be provided whereby the supply reel is driven in the reverse direction at a higher speed than the normal projection speed.)

In operation, when the drive motor 12 is energized, the drive shaft 20 is rotated and drives the shutter disc 13 directly affixed thereto, and the intermittent and continuous film drive mechanisms. The claw arm 24 of the intermittent system and the sprocket shafts 52 and 54 of the continuous system are operated in synchronism and may be coordinately switched in speed by shifting bar 92 forward to produce the desired slow motion operation without changing the shutter speed. It will be seen that the invention provides novel and improved film drive mechanisms which enable coordinated variation of speeds of the film drive independently of changes in speed of the shutter. In the preferred embodiment further speed control is provided which enables shutter speed change with accompanying corresponding speed changes in the film drive mechanisms through the drive motor control circuit. While a preferred embodiment of the invention has been shown and described, various modifications thereof will be obvious to those skilled in the art, and therefore it is not intended that the invention be limited to the disclosed embodiment or to details thereof and departures may be made therefrom within the spirit and scope of the invention as defined in the claims.

I claim:

1. Motion picture apparatus comprising in combination an image aperture,
    claw means for engaging perforations in the film for moving film past said image aperture with intermittent motion,
    said claw means being movable between first and second operative positions,
    control means to move said claw means between said first and second operative positions,
    shutter means disposed adjacent said image aperture,
    shutter drive means for operating said shutter at a predetermined rate for periodically allowing the transmission of light to said film,
    first claw drive means directly coupled to said shutter drive means for imparting motion to said claw means for advancing said film past said image aperture with intermittent motion at a first rate in synchronism with said predetermined rate when said claw means is in said first operative position,
    and second claw drive means directly coupled to said shutter drive means and operative in conjunction with said first claw drive means when said claw means is in said second position to periodically move said claw means into film perforation engaging position for advancing said film past said image aperture at a second rate that is a fraction of said first rate while maintaining synchronism with said predetermined rate.

2. The apparatus as claimed in claim 1 and further including continuous film drive means cooperating with said claw means to advance said film past said image aperture,
    said continuous film drive means including first means for driving said film at a continuous speed corresponding to said first rate of operation of said claw means,
    second means for driving said film at a second continuous speed corresponding to said second rate of operation of said claw means,
    and means coupled to said control means to change the speed of said continuous drive means concurrently with a change in rate of operation of said claw means.

3. The apparatus as claimed in claim 1 and further including means to vary said predetermined rate of operation of said shutter.

4. Film drive means for use in a motion picture projector comprising in combination claw means for engaging perforations in the film for moving motion picture film with intermittent motion,
    said claw means being movable between first and second operative positions,
    control means to move said claw means between said first and second operative positions,
    shutter drive means for operating a shutter at a predetermined rate for periodically allowing the transmission of light to said film,
    first claw drive means directly coupled to said shutter drive means for imparting motion to said claw means for advancing said film past with intermittent motion at a first rate in synchronism with said predetermined rate when said claw means is in said first operative position,
    and second claw drive means directly coupled to said shutter drive means and operative in conjunction with said first claw drive means when said claw means is in said second position to periodically move said claw means into film perforation engaging position for advancing said film past said image aperture at a second rate that is a fraction of said first rate while maintaining synchronism with said predetermined rate.

5. The drive means as claimed in claim 4 and further including continuous film drive means cooperating with said claw means to advance said film past said image aperture,
    said continuous film drive means including first means coupled to said shutter drive means for driving said film at a continuous speed corresponding to said first rate of operation of said claw means,
    second means coupled to said shutter drive means for driving said film at a second continuous speed corresponding to said second rate of operation of said claw means,
    and means coupled to said control means to change the speed of said continuous drive means concurrently with a change in rate of operation of said claw means.

6. The drive means as claimed in claim 4 wherein said shutter drive means is driven by a series wound electric motor and further including a variable resistance connected in series with said motor for varying its speed with corresponding variation in said predetermined rate of operation of said shutter.

7. A motion picture projector comprising in combination an image aperture,
    a shutter disposed adjacent said image aperture,
    said shutter having a plurality of circumferentially disposed apertures,
    shutter drive means for rotating said shutter at a predetermined rate for periodically allowing the transmisson of light through said apertures to motion picture film,
    claw means for engaging perforations in the film for moving the film past said image aperture with intermittent motion,
    said claw means being movable between first and second operative positions,
    control means to move said claw means between said first and second operative positions,
    first claw drive means directly coupled to said shutter drive means for imparting motion to said claw means for advancing said film past said image aperture with intermittent motion at a first rate in synchronism with said predetermined rate when said claw means is in said first operative position,
    and second claw drive means directly coupled to said shutter drive means and operative in conjunction with said first claw drive means when said claw means is in said second position to periodically move said claw means into film perforation engaging position for advancing said film past said image aperture at a second rate that is a fraction of said first rate while maintaining synchronism with said predetermined rate so that said film may be moved past said image aperture at a reduced rate of speed without change in the frequency or amount of light transmitted through the apertures of said shutter to said film.

8. The projector as claimed in claim 7 and further including continuous film drive means cooperating with said claw means to advance said film past said image aperture, said continuous film drive means including a sprocket,
a first gear train driven by said shutter drive means for driving said sprocket to continuously advance the film at a speed corresponding to said first rate of operation of said claw means,
a second gear train driven by said shutter drive means for driving said sprocket to continuously advance said film at a second speed corresponding to said second rate of operation of said claw means,
and means coupled to said control means to change the speed of said continuous drive means concurrently with a change in rate of operation of said claw means.

9. The projector as claimed in claim 7 wherein said shutter drive means is driven by a series wound electric motor and further including a variable resistance connected in series with said motor for varying its speed with corresponding variation in said predetermined rate of operation of said shutter.

10. A motion picture projector comprising in combination an image aperture, a shutter disposed adjacent said image aperture,
said shutter having a plurality of circumferentially disposed apertures,
shutter drive means for rotating said shutter at a predetermined rate for periodically allowing the transmission of light through said apertures to motion picture film,
claw means having a claw portion at one end for engaging perforations in the film for moving the film past said image aperture with intermittent motion,
said claw means being pivotally mounted adjacent the opposite end for pivoting movement about an axis perpendicular to the direction of film movement past said image aperture,
control means to move said claw pivot along said axis between first and second operative positions,
first claw drive means directly coupled to said shutter drive means for imparting motion to said claw means at a point intermediate said ends for advancing said film past said image aperture with intermittent motion at a first rate in synchronism with said predetermined rate when said claw pivot is in said first operative position,
and second claw drive means directly coupled to said shutter drive means and operative to cylically move said claw pivot along said axis when said claw pivot is in said second position to periodically move said claw means into film perforation engaging position for advancing said film past said image aperture in conjunction with said first claw drive means at a second rate that is a fraction of said first rate while maintaining synchronism with said predetermined rate so that said film may be moved past said image aperture at a reduced rate of speed without change in the frequency or amount of light transmitted through the apertures of said shutter to said film.

11. The projector as claimed in claim 10 wherein said first claw drive means includes a first cam mounted on said shutter shaft and said second claw drive means includes a second cam which acts against said claw pivot.

12. The projector as claimed in claim 11 wherein said control means includes a claw pivot restraining element movable between a first position restraining said claw pivot from movement caused by said second cam and a second position permitting movement of said claw pivot along said axis under the influence of said second cam.

13. The projector as claimed in claim 12 and further including continuous film drive means cooperating with said claw means to advance said film past said image aperture, said continuous film drive means including a sprocket,
a first gear train driven by said shutter drive means for driving said sprocket to continuously advance the film at a speed corresponding to said first rate of operation of said claw means,
a second gear train driven by said shutter drive means for driving said sprocket to continuously advance said film at a second speed corresponding to said second rate of operation of said claw means,
and means coupled to said control means to change the speed of said continuous drive means concurrently with a change in rate of operation of said claw means.

14. The projector as claimed in claim 13 wherein said first gear train includes a frictionally driven element and said second gear train includes an idler element which when engaged over-rides said first gear train to drive said sprocket at a reduced rate.

References Cited in the file of this patent

UNITED STATES PATENTS

| 1,582,032 | Gauriat | Apr. 27, 1926 |
| 1,833,371 | Owens | Nov. 24, 1931 |

FOREIGN PATENTS

| 812,020 | Great Britain | Apr. 15, 1959 |

OTHER REFERENCES

German application 1,095,659, published Dec. 22, 1960.